US006816912B1

(12) United States Patent
Borella et al.

(10) Patent No.: US 6,816,912 B1
(45) Date of Patent: Nov. 9, 2004

(54) METHOD AND SYSTEM FOR TUNNEL OPTIMIZED CALL SETUP FOR MOBILE NODES

(75) Inventors: Michael S. Borella, Naperville, IL (US); Yingchun Xu, Buffalo Grove, IL (US)

(73) Assignee: UTStarcom, Inc., Alameda, CA (US)

( * ) Notice: Subject to any disclaimer, the term of this patent is extended or adjusted under 35 U.S.C. 154(b) by 907 days.

(21) Appl. No.: 09/728,768

(22) Filed: Dec. 1, 2000

(51) Int. Cl.[7] .......................... G06F 15/173; H04Q 7/00
(52) U.S. Cl. ..................... 709/238; 370/328; 455/432.1
(58) Field of Search ................................ 709/238, 224, 709/215; 370/338, 401, 352, 328; 455/445, 432.1, 436, 435.1, 512; 379/93.32

(56) References Cited

U.S. PATENT DOCUMENTS

| | | | | | |
|---|---|---|---|---|---|
| 5,428,671 | A | * | 6/1995 | Dykes et al. ............. | 379/93.32 |
| 5,483,673 | A | * | 1/1996 | Hiben et al. ................. | 455/512 |
| 6,078,575 | A | * | 6/2000 | Dommety et al. .......... | 370/338 |
| 6,137,791 | A | * | 10/2000 | Frid et al. .................... | 370/352 |
| 6,201,962 | B1 | * | 3/2001 | Sturniolo et al. ......... | 455/432.2 |
| 6,243,758 | B1 | * | 6/2001 | Okanoue ..................... | 709/238 |
| 6,292,839 | B1 | * | 9/2001 | Naudus et al. .............. | 709/238 |
| 6,324,572 | B1 | * | 11/2001 | Silverman et al. .......... | 709/215 |
| 6,636,498 | B1 | * | 10/2003 | Leung ......................... | 370/338 |
| 6,697,354 | B1 | * | 2/2004 | Borella et al. ............... | 370/352 |
| 6,711,147 | B1 | * | 3/2004 | Barnes et al. ............... | 370/338 |
| 6,721,297 | B2 | * | 4/2004 | Korus et al. ................ | 370/338 |

OTHER PUBLICATIONS

Buddhikot et al, MobileNAT: A New Technique for Mobility Across Heterogeneous Address Spaces, Sep. 19, 2003, ACM, WMASH'03, pp. 75–84.*
Cheshire et al, Internet Mobility 4+4, Aug. 1996, ACM, SIGCOMM '96, pp. 1–12.*
RFC 2002–IP Mobility Support, Oct. 1996, Network Working Group.*

* cited by examiner

*Primary Examiner*—John Follansbee
*Assistant Examiner*—Kenny Lin
(74) *Attorney, Agent, or Firm*—McDonnell Boehnen Hulbert & Berghoff LLP

(57) ABSTRACT

A method and system for establishing and using a unidirectional virtual tunnel with foreign service applications (e.g., Session Initiation Protocol ("SIP"), H.323, etc.) on a foreign network for a mobile node (e.g., a Mobile Internet Protocol ("IP") node) that has roamed from a home network to the foreign network. The unidirectional virtual tunnel overrides a default communications path from foreign service applications on a foreign network to a home agent on home network and to a mobile network device on the foreign network and creates a new communications path from the foreign service applications to a tunnel server on the foreign network, to the foreign agent and to the mobile network device on the foreign network. The method and system may help reduce the round-time trip delays encountered when trying to establish a voice, video or data call (e.g., Voice over IP ("VOIP")) from a mobile device that has roamed from its home network to a foreign network and is using mobile IP to communicate.

33 Claims, 11 Drawing Sheets

METHOD AND SYSTEM FOR TUNNEL OPTIMIZED CALL SETUP FOR MOBILE NODES

FIELD OF INVENTION

This invention relates to communications on computer networks. More specifically, it relates to a method and system for tunnel optimized call setup for mobile nodes that have roamed from a home network to a foreign network.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location (e.g., 3Com Corporation in Santa Clara, Calif.) and an immobile Internet protocol address.

The Mobile-Internet Protocol (hereinafter Mobile IP) allows "mobile" nodes to transparently move between different Internet Protocol sub-networks ("subnets"). Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device.

When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates the mobile node is away from "home" (i.e., away from its home subnet). The registration with the foreign agent allows the mobile node to receive data on the foreign subnet.

The Mobile Internet Protocol allows a mobile node to dynamically change its network connectivity in a manner that is transparent to protocol layers above the Internet Protocol layer. For example, without re-establishing Transmission Control Protocol or User Datagram Protocol sessions.

As is known in the art, Transmission Control Protocol ("TCP") and User Datagram Protocol ("UDP") are often used over IP in computer networks. Transmission Control Protocol provides a connection-oriented, end-to-end reliable protocol designed to fit into a layered hierarchy of protocols that support multi-network applications. User Datagram Protocol provides a transaction oriented datagram protocol, where delivery and duplicate packet protection are not guaranteed.

It is often desirable to establish a voice, video and/or data call from a mobile network device that has roamed from its home network to a foreign network. Such a voice or data call is typically established using a call control protocol such as Session Initiation Protocol ("SIP"), H.323 and others.

However, there are several problems associated with using Mobile IP from a mobile network node to establish a communications path that includes a voice, video and/or data call. One problem is that round-trip routing to and from a mobile node is typically asymmetric and follows a triangular routing path.

A correspondent with a router receives data packets for the mobile node from an external network such as the Internet. The correspondent is, for example, a network access service provider being used by mobile node. The correspondent sends data packets for the mobile node to the mobile node's home agent.

The home agent creates a "virtual tunnel" to the foreign agent via the external network. When the foreign agent receives tunneled packets, it removes the tunnel packet headers and routes them to the mobile node, which is currently registered on the foreign network.

When the mobile node sends packets to an external destination on external network, no tunneling is used. Data packets are transmitted from mobile node to the correspondent, completing a virtual routing triangle. Thus, the round-trip routing because of its asymmetric triangular path introduces round-trip time ("RTT") delays for communications with the mobile node. Such round-trip time delays are undesirable for establishing voice, video or data calls.

Another problem is that whenever a mobile node using Mobile IP desires to establish a call, a number of different message sequence may be sent and received including Session Initiation Protocol ("SIP"), H.323, Authentication Authorization and Accounting ("AAA") (e.g., for billing), Domain Name System ("DNS") (e.g., for IP address decoding, etc.) requests and responses. These different message sequences, even though necessary to establish a voice, video or data call, also add additional round-trip time delays for establishing such a call.

Another problem is that whenever a mobile mode using Mobile IP makes call requests, a foreign call services application sends a response that currently must pass through a home agent on a home network for the mobile node, through a foreign agent on the foreign network and then to the mobile node on the foreign network. This adds at least one, but possible multiple extra round-trip time delay (s) to the transaction, depending on network configuration. Since calls, especially voice and video calls, must be established as quickly as possible in order to reduce post dial delay, satisfy human factors constraints, such as not irritating or confusing users due long call establishment delays, this extra round-trip time delay can present a significant problem for users.

This it is desirable to provide a method and system to reduce or eliminate extra round-trip time delays for voice, video or data calls on a mobile node that has roamed from a home network to a foreign network. The round-trip time delays should be reduced to optimize call setup as well as other communications to and from a mobile node using

SUMMARY OF THE INVENTION

In accordance with preferred embodiments of the present invention, some of the problems associated with establishing voice, video or data calls from mobile network devices are overcome. A method and system for tunnel optimized call setup for mobile nodes is presented.

One aspect of the invention includes a method and system for establishing and using a unidirectional virtual tunnel with foreign service applications (e.g., call service applications) on a foreign network. The unidirectional virtual tunnel overrides a default communications path from the foreign service applications on a foreign network to a home agent on a home network and to a mobile network device on the foreign network and creates a new communications path from the foreign service applications to a tunnel server on the foreign network, to the foreign agent and to the mobile network device on the foreign network. The method and system may help reduce the round-time trip delays encountered when trying to establish a voice, video or data call from a mobile device that has roamed from its home network to a foreign network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Network System

Figure 1:
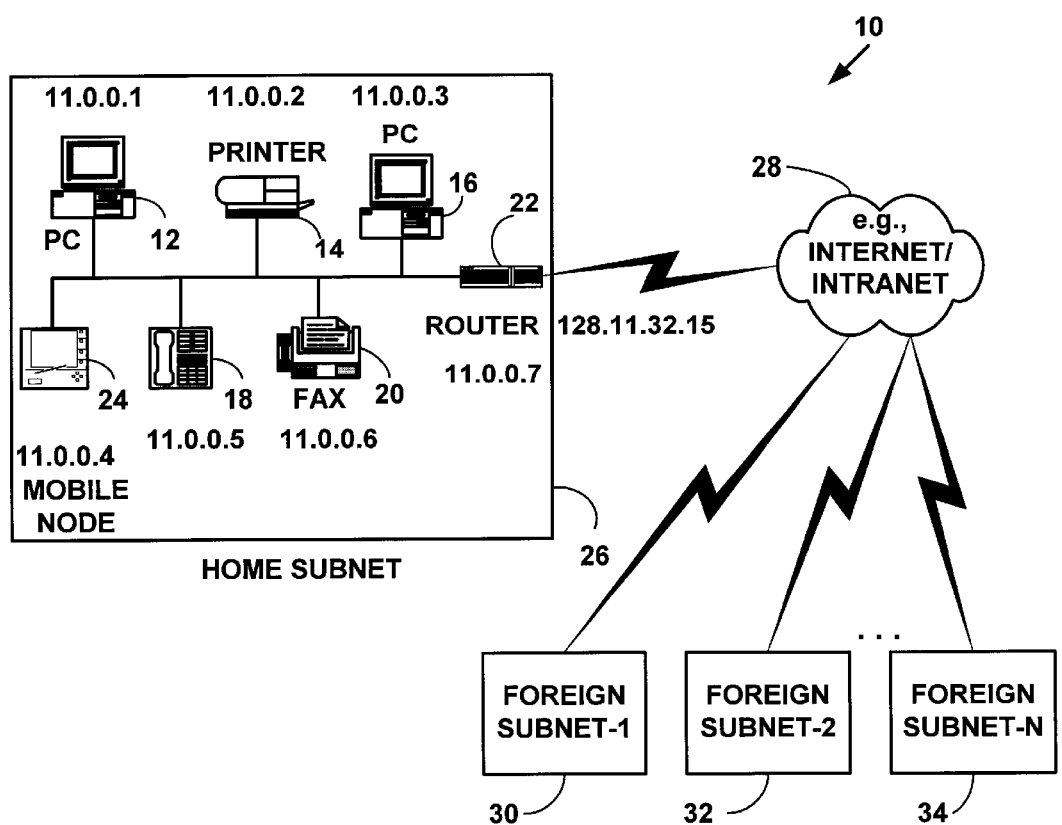
FIG. 1 is a block diagram illustrating an exemplary network system.

FIG. 1 is a block diagram illustrating an exemplary network system 10 for a preferred embodiment of the present invention. The network system 10 includes one or more local network devices 12, 14, 16, 18, 20, 22, 24, seven of which are illustrated. However, more or fewer network devices can also be used. The local network devices are assigned network addresses (e.g., 11.0.0.x) on a local subnet 26 as is illustrated in FIG; 1. The local subnet 26 includes but is not limited to, a wireless network, a LAN, an optical network or a cable network. However, other equivalent computer networks can also be used.

The local subnet 26 is connected to an external network 28 such as the Internet or an intranet via gateway router 22.

As is known in the art, a gateway connects computer networks using different networking protocols or operating at different transmission capacities. As is known in the art, a router translates differences between network protocols and routes data packets to an appropriate network node or network device. Local network devices on the local subnet 26 can reach one or more remote network devices on foreign subnets 30, 32, 34, via the external network 28.

Figure 3:
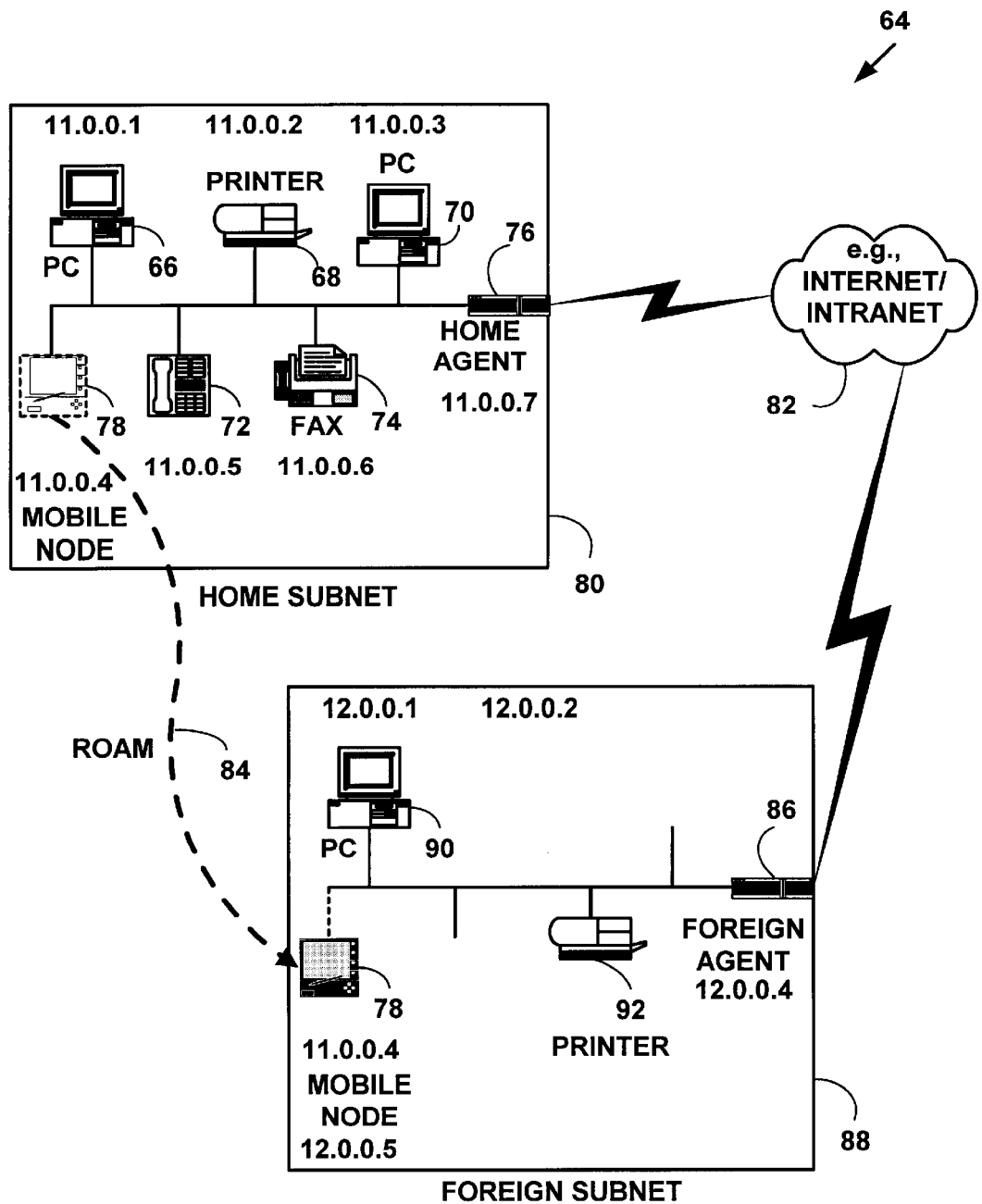
FIG. 3 is a block diagram illustrating an exemplary Mobile Internet Protocol system.

Network devices for preferred embodiments of the present invention include network devices that can interact with network system 10 and the exemplary mobile network system of FIG. 3 based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf org." The WAP standards can be found at the URL "www.wapforum.org."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed," or "processor-executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
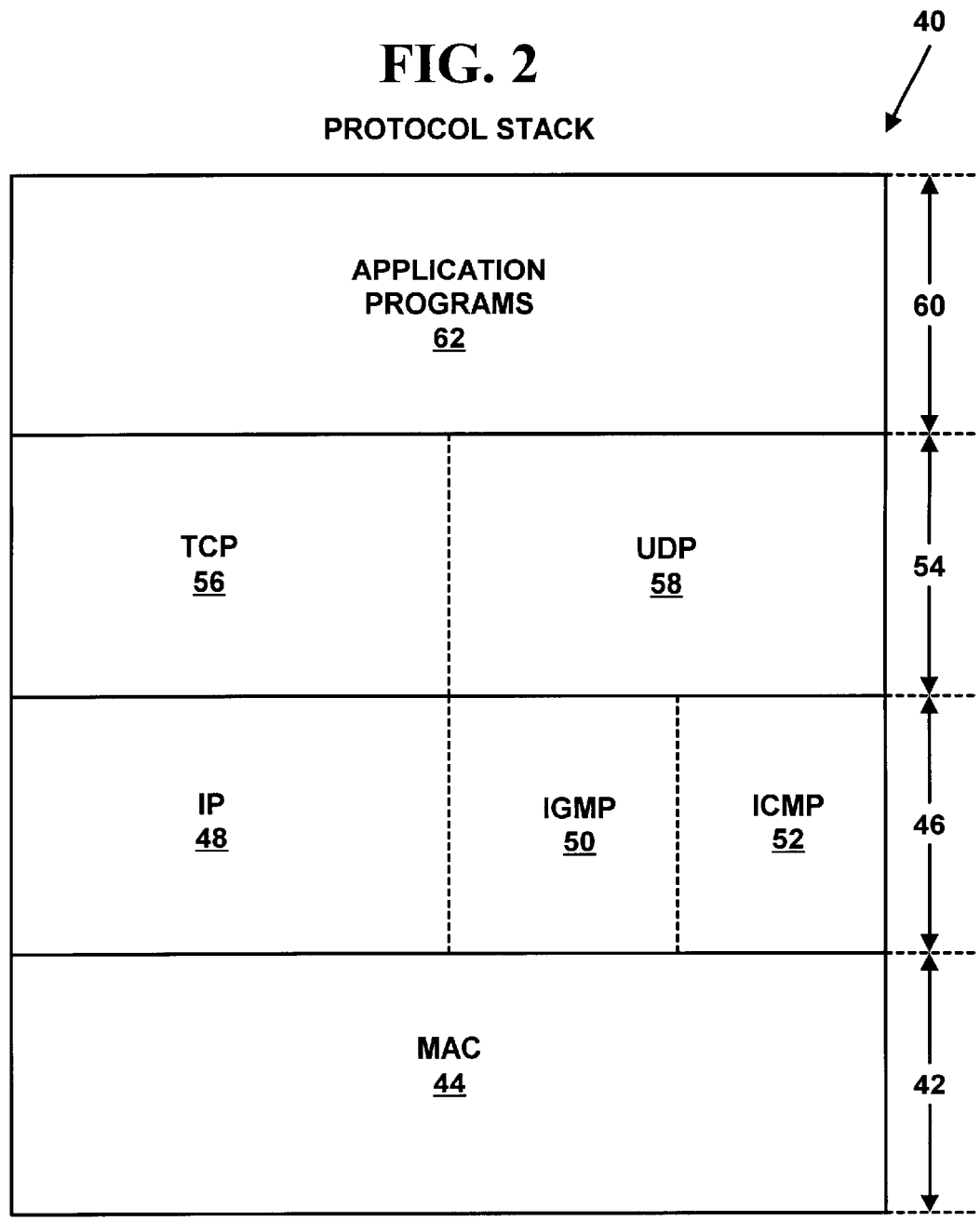
FIG. 2 is a block diagram illustrating a protocol stack for the network devices.

FIG. 2 is a block diagram illustrating an exemplary layered protocol stack 40 for network devices from the exemplary network system 10 (FIG. 1) and the exemplary mobile network system of FIG. 3. The layered protocol stack 40 is described with respect to Internet Protocol suites comprising from lowest-to-highest, a link, network, transport and application layer. However, more or fewer layers could also be used, and different layer designations could also be used for the layers in the protocol stack 40 (e.g., layering based on the Open Systems Interconnection ("OSI") model).

A link layer 42 is used to connect network devices to the local subnet 26. The link layer 42 includes a Medium Access Control ("MAC") protocol layer 44. As is known in the art, the MAC layer 44 controls access to a transmission medium via a physical layer. For more information on the MAC layer protocol see IEEE 802.3, incorporated herein by reference. However, the present invention is not limited to a MAC layer protocol 44 in the link layer 42 and other link layer protocols can also be used. The link layer 42 may also include other data-link protocols.

Above the link layer 42 is a network layer 46 (also called the "Internet Layer" for Internet Protocol suites). The network layer 46 includes an IP layer 48. As is known in the art, IP 48 is an addressing protocol designed to route traffic within a network or between networks. IP layer 48, hereinafter IP 48, is described in IETF RFC-791, incorporated herein by reference. The network layer 46 also includes an Internet Group Management Protocol ("IGMP") layer 50, an Internet Control Message Protocol ("ICMP") layer 52.

IGMP layer 50, hereinafter IGMP 50, is responsible for multicasting. For more information on IGMP 50, see IETF RFC-1112, incorporated herein by reference. ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference.

Above network layer 46 is a transport layer 54. The transport layer 54 includes a Transmission Control Protocol ("TCP") layer 56 and a User Datagram Protocol ("UDP") layer 58.

The TCP layer 56, hereinafter TCP 56, provides a connection-oriented, end-to-end reliable protocol designed to fit into a layered hierarchy of protocols which support multi-network applications. TCP 56 provides for reliable inter-process communication between pairs of processes in network devices attached to distinct but interconnected networks. For more information on TCP 56 see IETF RFC-793, incorporated herein by reference.

The UDP layer 58, hereinafter UDP 58, provides a connectionless mode of communications with datagrams in an interconnected set of computer networks. UDP 58 provides a transaction oriented datagram protocol, where delivery and duplicate packet protection are not guaranteed. For more information on UDP 58 see IETF RFC-768, incorporated herein by reference. Both TCP 56 and UDP 58 are not required in protocol stack 40. Either TCP 56 or UDP 58 can be used without the other.

Above the transport layer 54 is an application layer 60 including application programs 62. The application programs 62 provide desired functionality to a network device (e.g., telephony or other communications functionality). For example, application programs 62 may provide voice, video, audio, or other data applications.

In one embodiment of the present invention, the application layer 60 includes a Dynamic Host Configuration Protocol ("DHCP") application program 62. DHCP is a protocol for passing configuration information such as IP 48 addresses to network devices on an IP 48 network and other networks. For more information on DHCP see, RFC-1541, and RFC-2131 and RFC-2132, incorporated herein by reference.

In one embodiment of the present invention, the application layer 60 includes a Service Location Protocol ("SLP") application program 62. As is known in the art, SLP provides a scalable framework for the discovery and selection of network services. Using SLP, network devices using the Internet need little or no static configuration of network services for network based applications. For more information on SLP see IETF RFC-2608, incorporated herein by reference.

In one embodiment of the present invention, the application layer 60 includes a Session Initiation Protocol ("SIP") application program 62. As is known in the art, the Session-Initiation Protocol (SIP) is an application-layer 60 control (signaling) protocol for creating, modifying and terminating sessions with one or more participants. These sessions include Internet multimedia-conferences, Internet telephone calls (e.g., Voice over IP, "VoIP") and multimedia distribution. Members in a session can communicate via multicast or via a mesh of unicast relations, or a combination of these. SIP invitations used to create sessions carry session descriptions, which allow participants to agree on a set of compatible media types.

SIP supports user mobility by proxying and redirecting requests to a mobile network device's current location. Mobile network devices can register their current location. SIP is not tied to any particular conference control protocol. SIP is designed to be independent of a lower-layer transport protocol and can be extended. For more information on SIP, see IETF RFC-2543, "SIP: Session Initiation Protocol", the contents of which are incorporated by reference.

The application layer 60 may also include an ITU-T H.323 or H.324 application program 62. As is known in the art, H.323 is the main family of video conferencing recommendations for Internet Protocol ("IP") networks. The ITU-T H.323 standard is incorporated herein by reference. As is known in the art, H.324 is a video conferencing recommendation using plain-old-telephone-service ("POTS") lines. The ITU-T H.324 standard is incorporated by reference.

The application layer 60 may also include a Domain Name System ("DNS") application program 62. As is known in the art, the DNS provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated by reference. The application layer 60 may also include an Authentication Authorization and Accounting ("AAA") application program 62. As is known in the art, AAA includes a classification scheme and exchange format for accounting data records (e.g., for call billing, etc.). For more information on AAA applications, see, "Accounting Attributes and Record Formats," IETF RFC-2924, the contents of which are incorporated by reference. Other examples, of AAA applications include, but are not limited to, "Remote Authentication Dial In User Service (RADIUS)" described in IETF RFC-2865, the DIAMETER protocol, which is used for AAA for Mobile-IP, described in IETF draft <draft-calhoun-diameter-impl-guide-04.txt>entitled "DIAMETER Implementation Guidelines," July 2000, and IETF draft<draft-calhoun-diameter-mobileip-11.txt>, entitled "DIAMETER Mobile IP Extensions," September 2000, the contents of all of which are incorporated by reference. However, the present invention is not limited to these protocols, and other or equivalent AAA protocols can also be used.

In one embodiment of the present invention, one or more application programs 62 may be included in a network device, which also act as an application server. In another embodiment of the present invention, application programs 62 may be included in stand-alone application servers (e.g., SIP servers, H.323 servers, AAA servers, DNS servers, etc.). In such an embodiment, network devices may include only an application program layer (e.g., SIP) that communicates with an application program (e.g., SIP) running on the stand-alone application server to provide application functionality. However, the present invention is not limited to such embodiments, and other or equivalent embodiments could also be used.

Mobile IP

Mobile IP allows "mobile" nodes to transparently move between different IP sub-networks ("subnets"). Mobile IP allows a mobile node to dynamically change its network connectivity in a manner that is transparent to protocol layers above the network layer 46 (e.g., TCP 56 or UDP 58). For more information on Mobile IP see "Mobile IP: The Internet Unplugged," by J. D. Solomon, Prentice-Hall, 1998, ISBN-0-13-856246-6, and "IP Mobility Support" in IETF RFC-2002, both incorporated herein by reference. In a preferred embodiment of the present invention, support for Mobile IP is included in the IP 48 layer (FIG. 2).

FIG. 3 is a block diagram illustrating an exemplary Mobile IP system 64. The Mobile IP system 64 includes one or more "immobile" network devices 66, 68, 70, 72, 74, 76, six of which are illustrated, and a mobile node 78, one of which is illustrated. Hereinafter the mobile node 78 is called a "mobile node 78." However, more or fewer immobile network devices or more mobile network devices can also be used. The immobile network devices 66, 68, 70, 72, 74, 76, and the mobile node 78 are assigned a network addresses on a Home Subnet ("HS") 80 as is illustrated in FIG. 3. The home subnet 80 includes but is not limited to, a wireless network, a LAN, an optical network or a cable network. However, other equivalent computer networks can also be used. The home subnet 78 is connected to an external network 82 such as the Internet or an intranet via a home agent ("HA") 76. The home agent 76 is a "gateway router" for the home subnet 80.

When mobile node 78 "roams" 84 away from its home subnet 80, it periodically transmits Mobile IP "agent solicitation" messages to foreign agents, such as foreign agent ("FA") 86 (i.e., foreign with respect to home subnet 80), via external network 82. The foreign agent 86 resides on a foreign subnet 88 with one or more foreign immobile network devices 90,92, two of which are illustrated. The foreign subnet 88 may also include one or more mobile nodes (not illustrated in FIG. 3). The foreign agent 86 is a gateway router for the foreign subnet 88. The foreign immobile network devices 90,92 are assigned network addresses (e.g., IP 48 addresses) on the foreign subnet 88 as is illustrated in FIG. 3. (e.g., 12.0.0.x).

Roaming mobile node 78 listens for Mobile IP "agent advertisement" messages from foreign agents (i.e., foreign gateway routers such as foreign agent 86). When roaming mobile node 78 receives an agent advertisement message from a foreign agent indicating that it is now on a foreign subnet (e.g., foreign subnet 88), mobile node 78 registers with the foreign agent (e.g., foreign agent 86) and its home agent (e.g., home agent 76) indicating that the mobile node 78 has roamed 84 away from its home subnet 80.

As is illustrated in FIG. 3, the mobile node 78 has a network address (e.g., IP 48 address) of 11.0.0.4 on the home subnet 80. The home agent 76 has a network address of 11.0.0.7 on the home subnet 80. The mobile node 78 with network address 11.0.0.4, belongs to the home subnet 80 with network access prefix of 11.0.0 and a prefix length of 24 bits (i.e., 11.0.0.X/24). Network devices on the home subnet 80 have network addresses beginning with the network access prefix of 11.0.0 and a prefix length of 24 bits. Since the home agent 76 is advertising a route to the home subnet 80 at 11.0.0.X/24, it will accept data packets from external network 82 for network addresses with the network access prefix 11.0.0.X/24. For example, the home agent 76 accepts data packets for the mobile node 78 that has a home network address of 11.0.0.4, where X=4 since the network access prefix is equal to 11.0.0 with a length of 24-bits.

The foreign agent 86 has a network address of 12.0.0.4 on the foreign subnet 88. The foreign agent advertises a route to the foreign subnet 88 with network access prefix/prefix length of 12.0.0.Y/24. The foreign agent 86 will accept data packets that have a network address of 12.0.0.Y/24 on the foreign subnet 88. For example, the foreign agent will accept data packets for the immobile network devices 90,92 with a 110 network address of 12.0.0.1, where Y=1, since the network access prefix is equal to 12.0.0 with a length of 24-bits.

The mobile node 78 uses its home network address of 11.0.0.4 on the home subnet 80 to register with the foreign agent 86 and the home agent 76. After registration of the mobile node 78, the foreign agent 86 will also accept data packets for the mobile node 78 at the specific home network address 11.0.0.4 for the mobile mode 78 as well as data packets that have a network prefix of 12.0.0/24. The foreign agent 86 also assigns a temporary foreign network address called a care-of-address ("COA") on the foreign subnet 88 to the mobile node 78 (e.g., 12.0.0.5).

Triangular Routing for a Mobile Node

Figure 4:
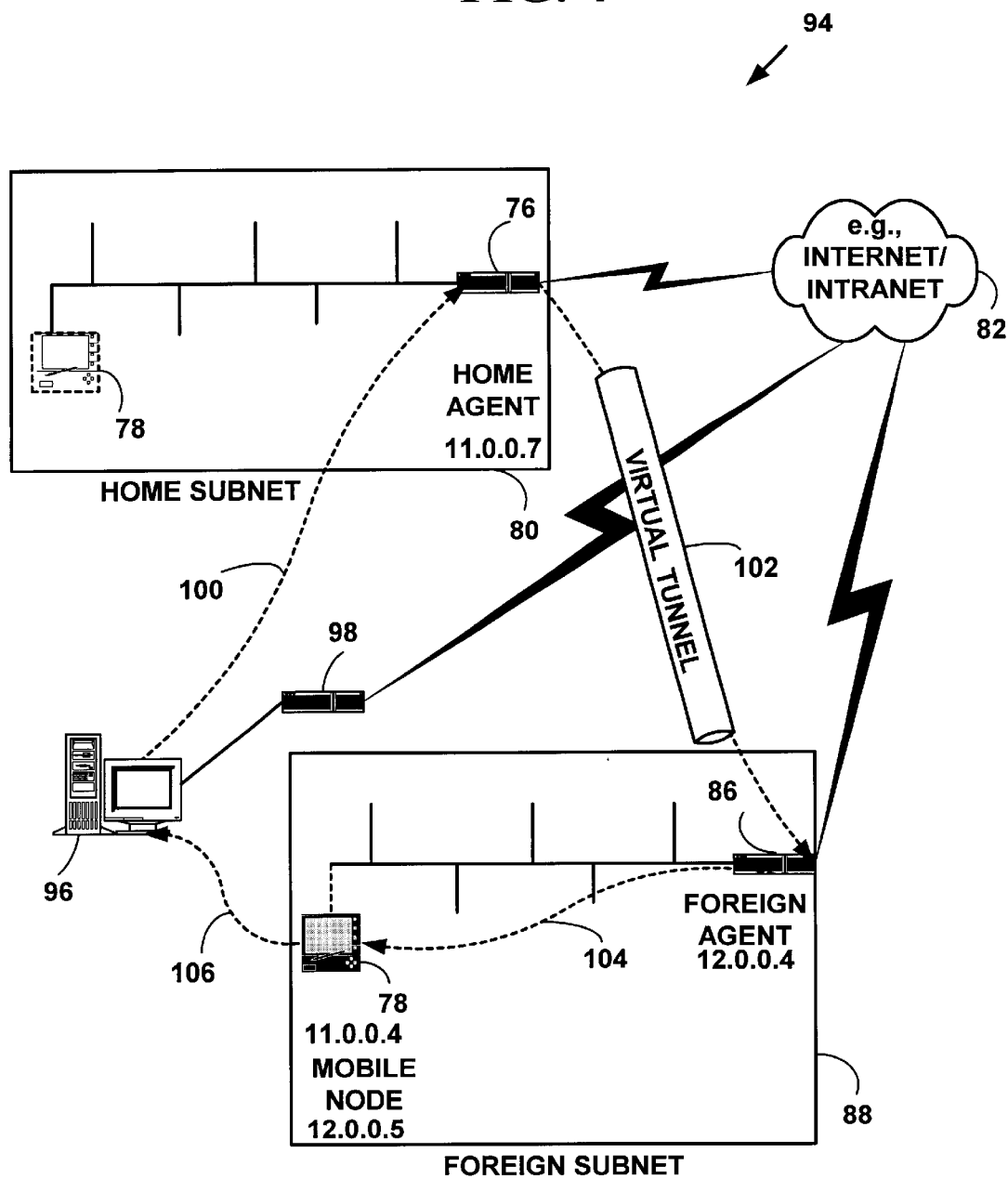
FIG. 4 is a block diagram illustrating triangular communications on an exemplary Mobile Internet Protocol system.

FIG. 4 is a block diagram illustrating exemplary Mobile IP communications in an exemplary Mobile IP system 94. Round-trip routing to and from the mobile node 78 is typically asymmetric and follows a triangular path. A "virtual" triangular routing path is illustrated in FIG. 4 with dashed lines. However, the actual routing path is accomplished between the home subnet 80 and the foreign subnet 88 using the solid line connections illustrated in FIG. 4 via external network 82.

As is illustrated in FIG. 4, a correspondent 96 with a router 98 receives data packets for the mobile node 78 from the external network 82. The correspondent 96 is, for example, a network access service provider being used by mobile node 78, or any other host device on the external network 82. In FIG. 4, the correspondent 96 sends data packets for the mobile node 78 to the mobile node's home agent 76. Dashed line 100 illustrates a "virtual" data flow pathway between the correspondent 96 and the home agent 76.

Assuming that the mobile node 78 has roamed 84 to the foreign subnet 88 and has registered its current location (e.g., on foreign subnet 88 and on the home subnet 80), the home agent 76 creates a "virtual tunnel" 102 to the foreign agent 86 via external network 82. As is known in the art, a virtual tunnel can be created by encapsulating a data packet inside another data packet by adding additional tunnel packet headers. In one preferred embodiment of the present invention, IP-in-IP tunneling is used. For more information on IP-in-IP tunneling see IETF RFC-1853, incorporated herein by reference. However, other virtual tunnels can also be created (e.g., UDP 58 tunneling or double IP-in-IP tunneling, etc.). When the foreign agent 86 receives tunneled packets, it removes the tunnel packet headers and routes 104 them to the mobile node 78, which is currently registered on the foreign network 86.

When the mobile node 78 sends packets to an external destination on external network 82, no tunneling is used. Data packets are transmitted 106 from mobile node 78 to the correspondent 96. Thus, a "virtual" routing triangle is formed as illustrated by the dashed lines in FIG. 4. The virtual routing triangle is a "logical" route rather than a "physical route." The physical route includes routes through external network 82. The correspondent 96 routes the data packets on to the external destination via the external network 82. Thus, the round-trip routing because of its asymmetric triangular path, introduces round-trip time ("RTT") delays for communications with the mobile node 78.

The mobile node 78, the home agent 76, and the foreign agent 86 typically maintain some Mobile IP state information. The mobile node 78 periodically transmits "keep-alive" messages using ICMP 52 messages, including standard ICMP 52 messages, and other ICMP 52 messages that are unique to Mobile IP. Mobile node 78 can roam to foreign subnets other than foreign subnet 88 and register with other foreign agents using Mobile IP.

Third Generation Mobile Architecture

Third-generation ("3G") architecture, as defined by ITU-T IMT-2000, supports, data rates ranging from 384K bits-per-second to 2M bits-per-second, packet switched services including IP 48 traffic, symmetrical and asymmetrical data rates, multimedia services including video conferencing and streaming video, international roaming among different 3G operating environments. The ITU-T IMT-2000 standard is incorporated herein by reference.

3G networks implementing IMT-2000 including wireless and cellular network devices allow mobile network devices that can roam from network-to-network to use Mobile IP. Many of these mobile network devices will be wireless phones or similar devices that need to establish, maintain and terminate call sessions. A call control protocol such as SIP, H.323, etc. is used for session control. These call control protocols allow a local proxy to be used on foreign networks so that local policy and/or bandwidth management can be applied to local and remote sessions. In the current generation of 3G networks, a local proxy is typically used on all foreign networks. A local proxy may be included in the foreign agent 86 or in a stand-alone local proxy server or application program on the foreign network 88.

Figure 5:
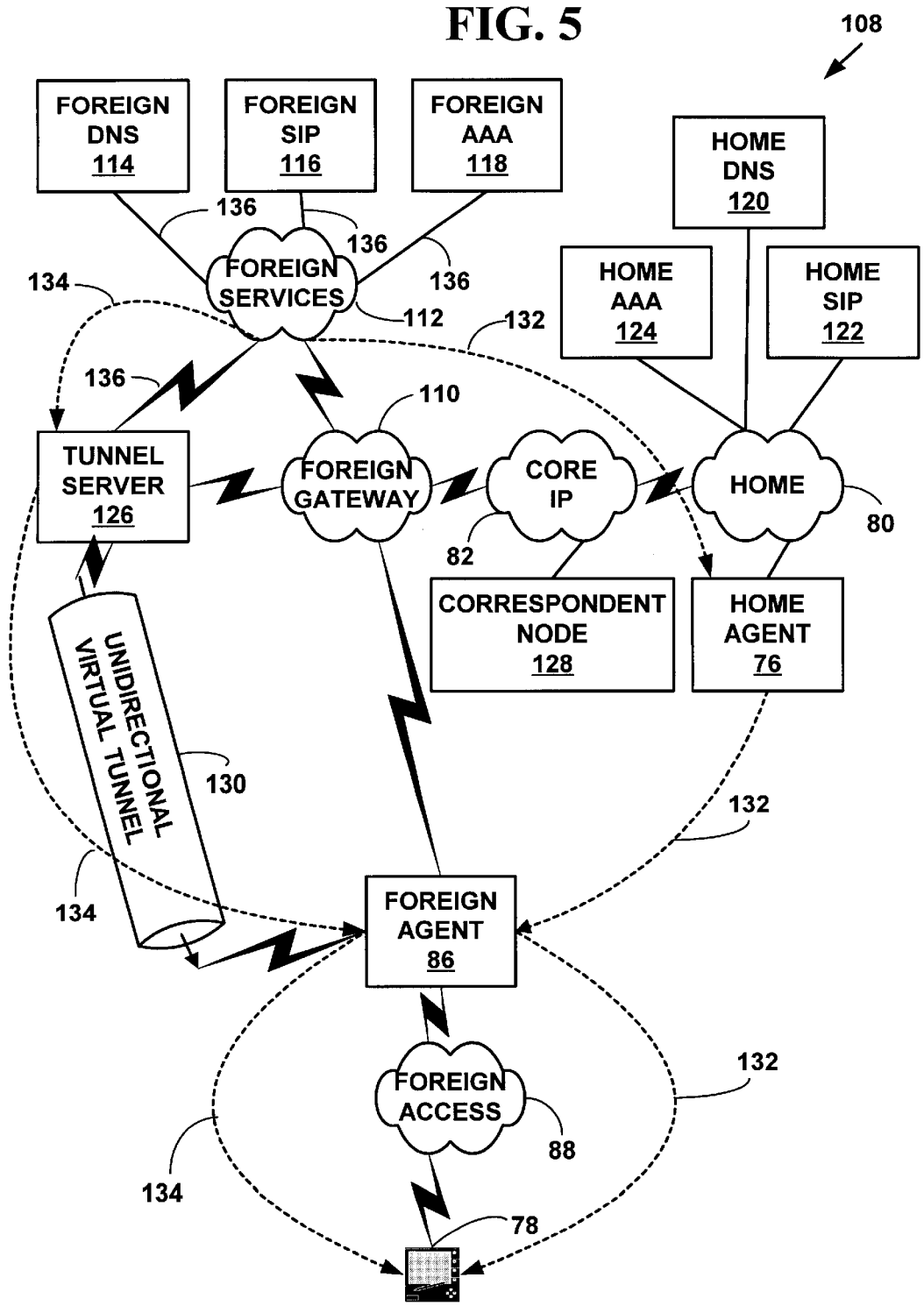
FIG. 5 is a block diagram illustrating an exemplary 3G system.

FIG. 5 is a block diagram illustrating an exemplary 3G system 108. The exemplary 3G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a correspondence node ("CN") 128.

The foreign gateway network 110 and foreign services network 112 are illustrated as separate from foreign network 88. For example, the foreign gateway network 110 can include an IP 48 network or other network, the foreign services network 112 can include an IP 48 network, the Public Switched Telephone Network ("PSTN"), a packet data service node ("PDSN"), or other network or network device. In one embodiment of the present invention, the foreign agent 86 includes a PDSN. However, the present invention is not limited to this implementation and other types of foreign agents can also be used. However, the foreign gateway network 110 and the foreign services network 112 can also all be integral to foreign network 88.

In one embodiment of the present invention, the foreign gateway network 110 and the foreign services network 112 are integral to foreign network 88. In another embodiment of the present invention, the foreign network 88, foreign gateway network 110 and foreign services network 112 are separate networks. However, in such an embodiment, the separate foreign networks are collectively referred to as "foreign network 88" for the sake of simplicity.

The exemplary 3G system 108 includes a unidirectional virtual tunnel 130, explained below, a default communications path 132 a new communications path 134, and a tunnel server communications path 136. The default communications path 132 includes a communications path from the foreign services applications 114, 116, 118 on a foreign network, to the home agent 76 on the home network 80, to the foreign agent 86 on the foreign network 88 and to the mobile node 78 on the foreign-network 88. The new communications path 134 includes a communications path from the foreign services applications 114, 116, 118, to the tunnel server 126 on a foreign network, to the foreign agent 86, and to the mobile node 78 on the foreign network 88. The tunnel server communications path 136 includes a communications path between the foreign service applications 114, 116, 118 and the tunnel server 126.

The exemplary 3G system 108 also includes the home agent 76, mobile node 78, home network 80, external network 82, foreign agent 86 and foreign network 88 as described above (FIG. 3). The home network 80 and the foreign network components include, but are not limited to, a wireless network, a LAN, an optical network or a cable network. However, other equivalent high-speed computer networks can also be used. However, the present invention is not limited to the exemplary 3G system illustrated, and more, fewer or equivalent components can also be used.

Mobile Node Call Setup

The SIP is typically used as a call control protocol for mobile node 78 call setup. Virtually any other call control protocol (e.g., H.323, etc.) can be used in place of SIP. However, these call control protocols will also suffer from similar call RTT delays described herein for SIP.

SIP call setup comprises three one-way messages between an initiator (I) and a recipient (R). Table 1 illustrates the three one way messages.

TABLE 1

I → R: Invite
R → I: Acknowledgement (ACK)
I → R: Ok

A SIP call setup comprises a total of 1 ½ round-trip time ("RTT") delay, where RTT is the round-trip time between the I and the R. When a SIP call setup occurs when mobile node 78 is roaming, all packets routed to the mobile node 78 via the home agent 76 causes additional unnecessary latency in addition to the triangular routing delays discussed above. Table 2 illustrates a SIP call setup when the mobile node 78 is roaming for calls initiated the mobile node 78.

TABLE 2

I → R: Invite
Mobile node 78 → foreign SIP application 116 →
home SIP application 122 → correspondent node
128 (or mobile node 78 → foreign SIP application
116 → correspondent node 128) (1/2 RTT)
R → I: Acknowledgement
Correspondent node 128 → home SIP application
122 → foreign SIP application 116 (→ home agent
76) → mobile node 78 (1 1/2 RTT)

TABLE 2-continued

```
I → R: Ok
Mobile node 78 → foreign SIP application 116 →
home SIP application 122 → correspondent node
128 (or mobile node 78 → foreign SIP application
116 → correspondent node 128) (1/2 RTT)
```

A SIP call setup comprises a total of 2 ½ RTT when the mobile node 78 is roaming and initiating calls.

Table 3 illustrates a SIP call setup when the mobile node 78 is roaming for calls received by the mobile node 78.

TABLE 3

```
I → R: Invite
Correspondent node 128 → home SIP application
122 → foreign SIP application 116 (→ home agent
76) → mobile node 78 (1 1/2 RTT)
R → I: Acknowledgement
Mobile node 78 → foreign SIP application 116 →
home SIP application 122 → correspondent node
128 (or mobile node 78 → foreign SIP application
116 → correspondent node 128) (1/2 RTT)
I → R: Ok
Correspondent node 128 → home SIP application
122 → foreign SIP application 116 (→ home agent
76) → mobile node 78 (1 1/2 RTT)
```

A SIP call setup comprises a total of 3 ½ RTT when the mobile node 78 is roaming and receiving calls.

Whenever the foreign SIP application 116 sends a packet to the mobile node 78 when roaming, the packet must go through the home agent 76, which adds an extra RTT to the transaction. Since calls must be established as quickly as possible in order to satisfy human factor constraints, this type of extra delay is a significant problem.

Tunneled Communications Path for Mobile Network Devices

Figure 6:
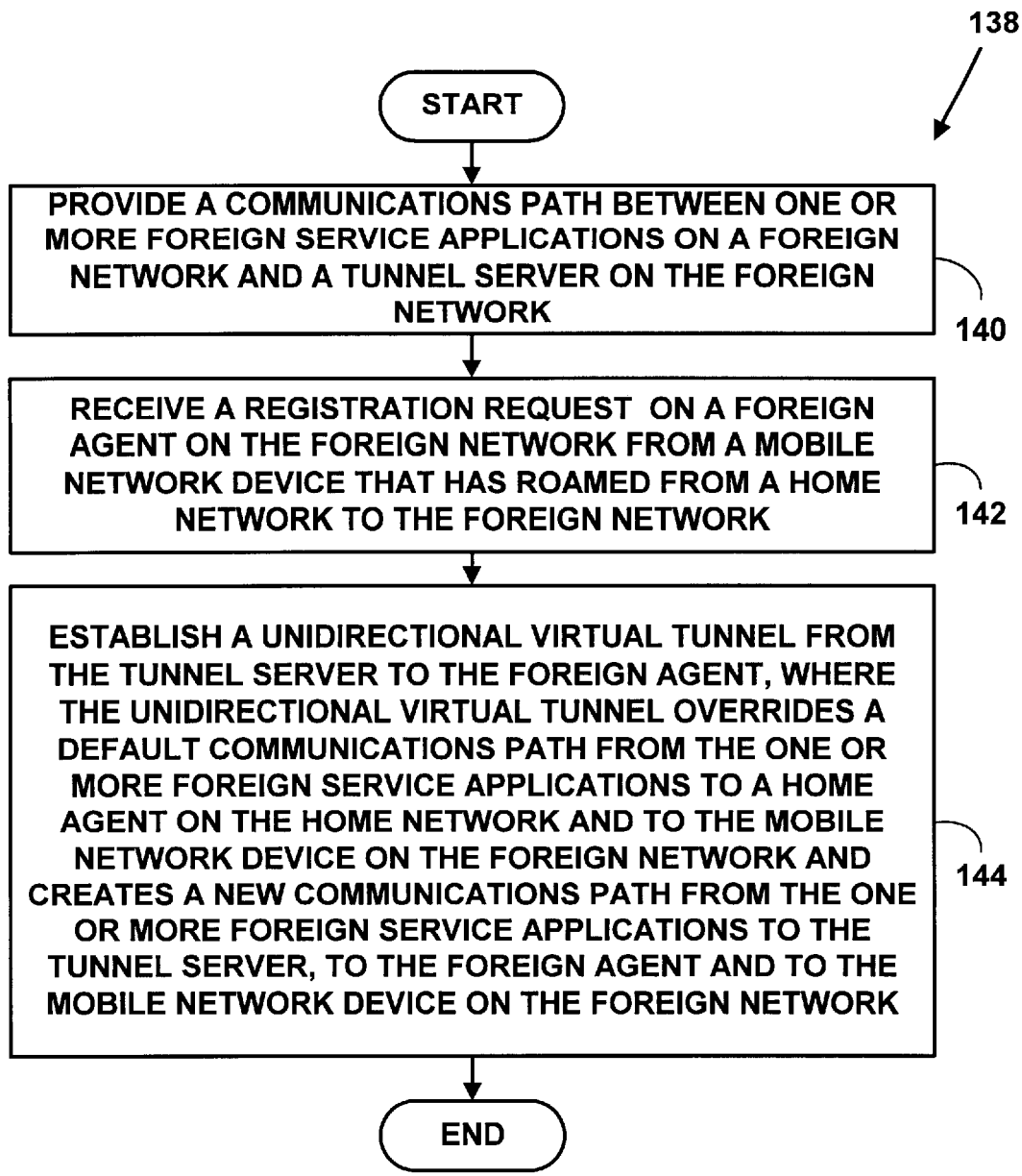
FIG. 6 is a flow diagram illustrating a method for creating a tunneled communications path for a mobile network device.

FIG. 6 is a flow diagram illustrating a Method 138 for creating a tunneled communications path for a mobile network device. At Step 140, a communications path between one or more foreign service applications on a foreign network and a tunnel server on the foreign network is provided. At Step 142, a registration request is received on a foreign agent on the foreign network from a mobile network device that has roamed from a home network to the foreign network. At Step 144, a unidirectional virtual tunnel is established from the tunnel server to the foreign agent. The unidirectional virtual tunnel overrides a default communications path from the one or more foreign service applications to a home agent on the home network and to the mobile network device on the foreign network and creates a new communications path from the one or more foreign service applications to the tunnel server, to the foreign agent and to the mobile network device on the foreign network.

In one embodiment of the present invention, Method 138 further comprises tunneling data packets at the tunnel server from the one or more foreign service applications via the unidirectional virtual tunnel to the foreign agent. The un-tunneled data packets are sent from the foreign agent to the mobile network device.

Method 138 is illustrated with a specific exemplary embodiment. However, the present invention is not limited to this specific exemplary embodiment and other or equivalent embodiments can also be used with Method 138.

In such an embodiment at Step 140, a tunnel server communications path 136 between one or more foreign service applications 114, 116, 118 on a foreign network 88 and a tunnel server 126 is provided.

In one preferred embodiment of the present invention, the tunnel server communications path 136 is provided by providing routing information to a router for which all foreign service applications 114, 116, 118 are "put behind." In such an embodiment, the routing information is supplied only to the router and not directly to the foreign service applications 114, 116, 118. Such an embodiment simplifies routing updates and provides flexibility for adding or removing foreign service applications.

In another embodiment of the present invention, the tunnel server communications path 136 is provided by providing routing information such as IP 48 addresses of a tunnel server 126 directly to a foreign DNS application 114, a foreign SIP application 116, a foreign AAA application 118 and other foreign service applications (e.g., H.323, etc.) on a foreign network 88. The tunnel server 126 is in communications with a foreign gateway network 88. The foreign agent 86 is in communications with the foreign network 88 as well as the tunnel server 126.

In another embodiment of the present invention, routing information is provided to the foreign services applications 114, 1165, 118 and a static unidirectional tunnel communications path 136 is established using the routing information between the foreign services applications 114, 116, 118 and the tunnel server 126 prior to any use by the mobile node 78. However, the present invention is not limited to establishing a static unidirectional tunnel communications path 136, and a dynamic unidirectional tunnel can be established dynamically when needed using the routing information.

At Step 142, a Mobile IP registration request is received on a foreign agent 86 on the foreign network 88 from a mobile node 78 that has roamed 84 from a home network 80 to the foreign network 88 and is using Mobile IP. The mobile node 78 for this method and the other methods described herein includes a wireless phone, personal digital assistant, personal computer, an Internet appliance and other equivalent devices that can be physically moved from one location to another.

At Step 144, a unidirectional virtual IP 48 tunnel 130 is established from the tunnel server 126 to the foreign agent 86. The unidirectional virtual IP 48 tunnel 130 overrides a default communications path 132 from the one or more foreign service applications 114, 116, 118 to a home agent 76 on the home network 80 band to the mobile node 78 on the foreign network 88 and creates a new communications-path 134 from the one or more foreign service applications 114, 116, 118, to the tunnel server 126, to the foreign agent 86 and to the mobile node 78 on the foreign network.

The new communications path 134 helps reduce RTT delays between the foreign service applications 114, 116, 118 when the mobile node 78 desires to establish a communications such as a voice, video or data call from the foreign network 88. The reduced delay may help to improve speed of establishing a communications and improve user satisfaction.

Tunneled Communications Path at a Tunnel Server

Figure 7:
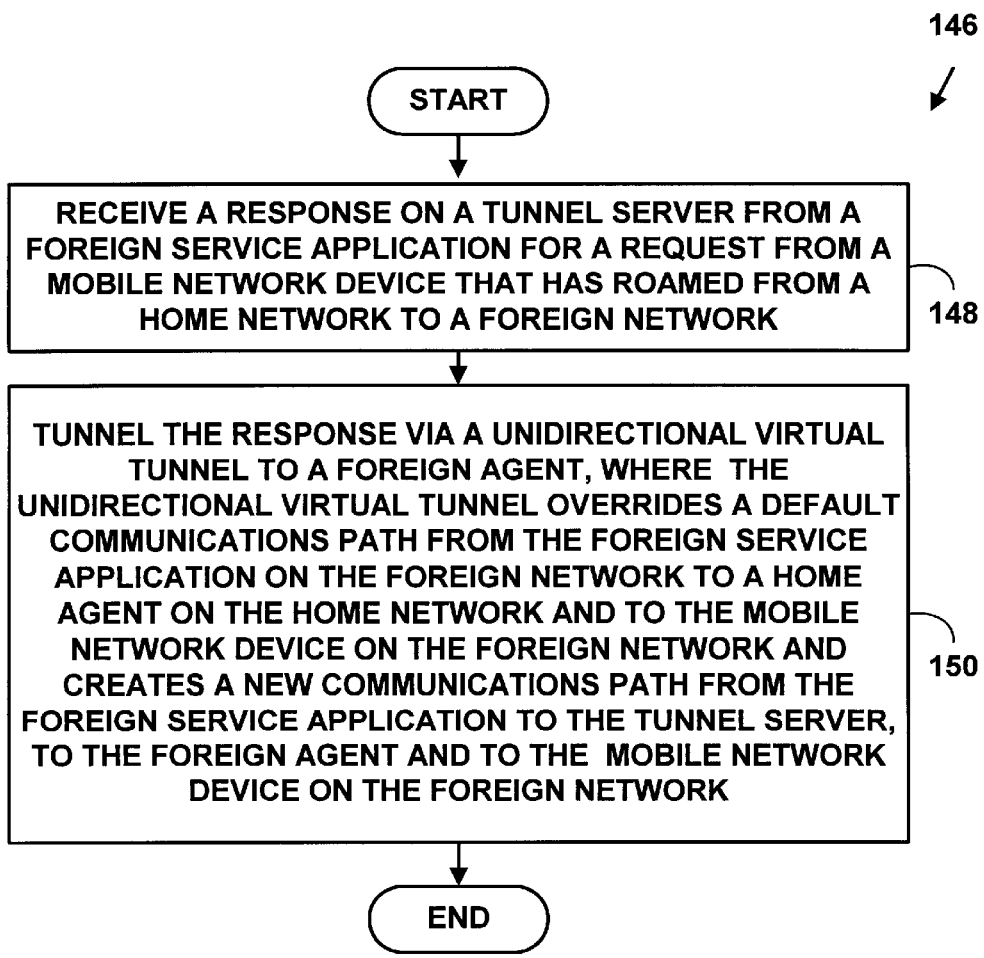
FIG. 7 is a flow diagram illustrating a method for creating a tunneled communications path at a tunnel server.

FIG. 7 is a flow diagram illustrating a Method 146 for creating a tunneled communications path at a tunnel server. At Step 148, a response is received on a tunnel server from a foreign service application for a request from a mobile network device that has roamed from a home network to a foreign network. At Step 150, the response is tunneled via a unidirectional virtual tunnel to a foreign agent. The unidirectional virtual tunnel overrides a default communications path from the foreign service application on the foreign network to a home agent on the home network and to the mobile network device on the foreign network and creates a new communications path from the foreign service application to the tunnel server, to the foreign agent and to the mobile network device on the foreign network.

Method 146 is illustrated with a specific exemplary embodiment. However, the present invention is not limited to this specific exemplary embodiment and other or equivalent embodiments can also be used with Method 146.

In such a specific embodiment at Step 148, a response (e.g., SIP ACK, SIP OK, etc.) is received on a tunnel server 126 from a foreign service application 114, 116, 118 for a request from a mobile node 78 that has roamed 84 from a home network 80 to a foreign network. 88: At Step 150, the response is tunneled via a unidirectional virtual IP 48 tunnel 130 to a foreign agent 86. The unidirectional virtual tunnel 130 overrides a default communications path 132 from the foreign service application 114, 116, 118 on the foreign network 88 to a home agent 76 on the home network 80 and to the mobile node 78 on the foreign network 88 and creates a new communications path 134 from the foreign service application 144, 116, 118 to the tunnel server 126, to the foreign agent 86 and to the mobile node 78 on the foreign network 88.

In one embodiment of the present invention, all foreign service applications 114, 116, 118 that need to communicate with the mobile node 78 are placed "behind" the tunnel server 126 and are in communications with a router. The foreign service applications 114, 116, 118 communicate with the tunnel server 126 via the router and the tunnel server communications path 136. That is, the foreign service applications 114, 116, 118 are only available via the tunnel server 126 and not directly. In another embodiment of the present invention, only selected foreign services are placed behind the tunnel server 126 (e.g., only those related to call processing).

Placing foreign service applications 114, 116, 118 behind the tunnel server 126 allows the new communications path 134 to be used. This new communication path 134 helps reduce RTT delays when the mobile node 78 that has roamed 84 to a foreign network desires to create a communications path including a call.

Tunneled Communications Path at Foreign Agent

Figure 8:
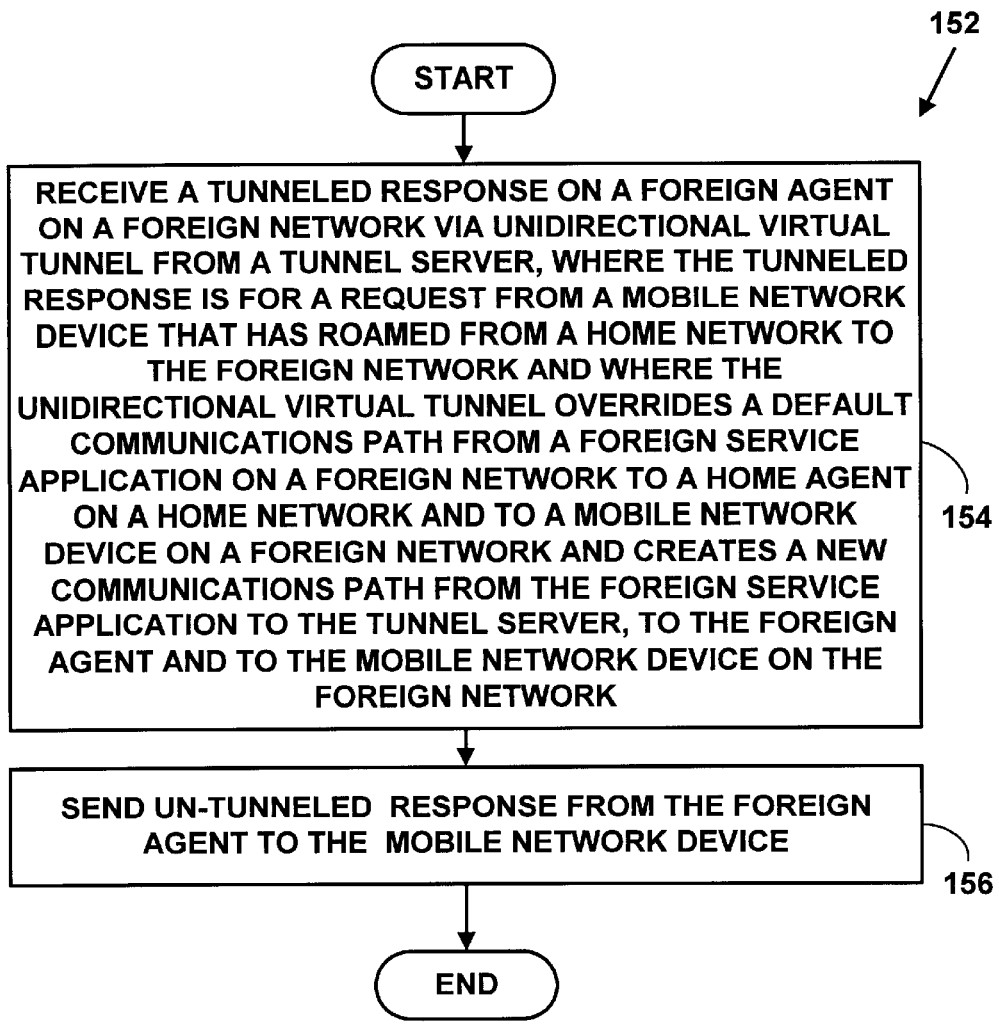
FIG. 8 is a flow diagram illustrating a method for creating a tunneled communications path at a foreign agent.

FIG. 8 is a flow diagram illustrating a Method 152 for creating a tunneled communications path at a foreign agent. At Step 154, a tunneled response is received on a foreign agent on a foreign network via unidirectional virtual tunnel from a tunnel server. The tunneled response is for a request from a mobile network device that has roamed from a home network to the foreign network. The unidirectional virtual tunnel overrides a default communications path from a foreign service application on a foreign network to a home agent on a home network and to a mobile network device on the foreign network and creates a new communications path from the foreign service application to the tunnel server, to the foreign agent and to the mobile network device on the foreign network. At Step 156, an un-tunneled response is sent from the foreign agent to the mobile network device.

Method 152 is illustrated with a specific exemplary embodiment. However, the present invention is not limited to this specific exemplary embodiment and other or is equivalent embodiments can also be used with Method 152.

In such a specific embodiment at Step 156, an IP 48 tunneled response (SIP OK, SIP ACK, etc.) is received on a foreign agent 86 on a foreign network 88 via unidirectional virtual IP 48 tunnel 130 from a tunnel server 126. The IP 48 tunneled response is for a request from a mobile node 78 that has roamed 84 from a home network 80 to the foreign network 88. The unidirectional virtual tunnel 130 overrides a default communications path 132 from a foreign service application 114, 116, 118 on the foreign network 88, to a home agent 76 on the home network 80 and to the mobile node 78 on the foreign network 88 band creates a new communications path 134 from the foreign service application 114, 116, 118 to the tunnel server 126, to the foreign agent 86 and to the mobile node 78 on the foreign network 88. At Step 156, an un-tunneled response (e.g., SIP ACK, SIP OK, etc.) is sent from the foreign agent 86 to the mobile node 78.

In one embodiment of the present invention, responses sent from foreign service applications to the mobile node 78 are tunneled via the foreign agent 86. However, requests from the mobile node 78 are sent directly to a foreign service application 114, 116, 118 as is explained below and are not tunneled via the tunnel server 126 since the tunnel is unidirectional.

The unidirectional virtual tunnel 130 helps reduce RTT delays when the mobile node 78 that has roamed 84 to a foreign network 88 desires to create a communications path including a call.

Shortened Communications Path at a Mobile Network Device

Figure 9:
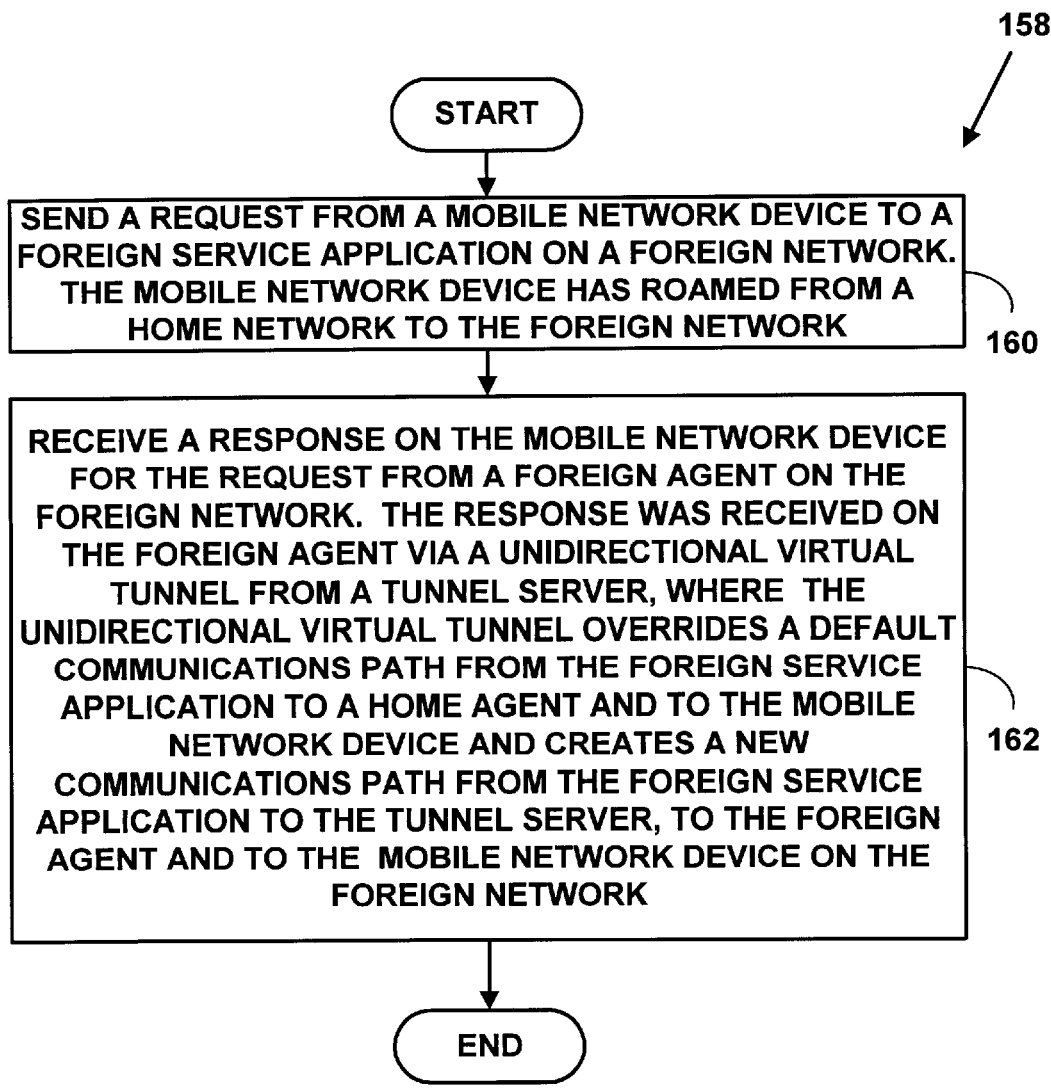
FIG. 9 is a flow diagram illustrating a method for creating shortened communications path at a mobile network device.

FIG. 9 is a flow diagram illustrating a Method 158 for creating shortened communications path at a mobile network device. At Step 160, a request is sent from a mobile network device to a foreign service application on a foreign network. The mobile network device has roamed from a home network to the foreign network. At Step 162, a response is received on the mobile network device for the request from a foreign agent on the foreign network. The response was received on the mobile network device via a foreign agent via a unidirectional virtual tunnel from a tunnel server. The unidirectional virtual tunnel overrides a default communications path from the foreign service application to a home agent on a home network and to the mobile network device and creates a new communications path from the foreign service application to the tunnel server, to the foreign agent and to the mobile network device on the foreign network.

Method 158 is illustrated with a specific exemplary embodiment. However, the present invention is not limited to this specific exemplary embodiment and other or equivalent embodiments can also be used with Method 158.

In such a specific embodiment, at Step 160, a foreign services request (e.g., SIP, DNS, AAA, H.323, request etc.) is sent from the mobile node 78 on the foreign network to a foreign service application 114, 116, 118 on a foreign network 88. The mobile node 78 has roamed 84 from the home network 80 to the foreign network 88. In one embodiment of the present invention, Step 160 includes notifying the mobile node 78 of a network address of a foreign service application 114, 116, 118 on the foreign network 88 with a notification mechanism. The request is sent from the mobile node 78 directly to the network address for a foreign service application 114, 116, 118.

In one embodiment of the present invention, the notification mechanism is a dynamic notification mechanism that includes a DHCP message, an SLP message or an extension to a Mobile IP advertisement message with an IP 48 address of a foreign service application 114, 116, 118. The extension includes an additional option sent in the Mobile IP advertisement message. This dynamic notification allows a mobile node 78 to directly locate a foreign services application 114, 116, 118 without sending additional messages to a foreign agent 86.

The Mobile IP specification defines Mobile IP extensions as is illustrated in Table 4. Mobile IP defines a general Extension mechanism to allow optional information to be carried by Mobile IP control messages or by ICMP 52 router discovery messages.

TABLE 4

Mobile IP Extensions in Type-Length-Value format:

```
 0                   1                   2
 0 1 2 3 4 5 6 7 8 9 0 1 2 3 4 5 6 7 8 9 0 1 2
|      Type       |     Length      |   Data ...
```

| | |
|---|---|
| Type | Indicates the particular type of Extension. |
| Length | Indicates the length (in bytes) of the data field within this Extension. The length does NOT include the Type and Length bytes. |
| Data | The particular data associated with this Extension. This field may be zero or more bytes in length. The Format and length of the data field is determined by the type and length fields. |

In one embodiment of the present invention, an extension to a Mobile IP advertisement message is used as illustrated in Table 5. This extension, in TLV format allows an IP address of a particular service to be passed to a registering mobile device. This Mobile IP advertisement message extension can be used in place of DHCP or SLP. In such an embodiment, the value field is further sub-divided to include a Service and an Address identifier.

TABLE 5

Mobile IP advertisement message extension

| Type | Length | Value | |
|---|---|---|---|
| TYPE | LENGTH | SERVICE (2 bytes) | ADDRESS (4 bytes) |

In the embodiment illustrated in Table 5, the Service field refers to a service type, where unique numbers are assigned to each service (i.e., 1=SIP, 2=AAA, 3=DNS, etc.). The Address field includes an IP 48 version 4 ("IPv4") address of a device providing the service. If IP 48 version 6 ("IPv6") is used, the Address field will be 16 bytes. However, the present invention is not limited to such a Mobile IP advertisement message extension, and other types of Mobile IP advertisement message extensions can also be used.

At Step 162, a foreign services response (e.g., SIP ACK, SIP OK, etc.) is received on the mobile node 78 for the foreign services request from a foreign agent 86 on the foreign network 88. The foreign services response was received on the foreign agent 86 via a unidirectional virtual tunnel 130 from a tunnel server 126. The unidirectional virtual tunnel 130 overrides a default communications path 132 from the foreign service application 114, 116, 118 on the foreign network 88 to the home agent 76 on the home network 80 and to the mobile node 78 on the foreign network and creates a new communications path 134 from the foreign service application 114, 116, 118 to the tunnel server 126, to the foreign agent 86 and to the mobile node 78 on the foreign network 88.

The unidirectional virtual tunnel 130 helps reduce RTT delays when the mobile node 78 that has roamed 84 to a foreign network 88 desires to create a communications path for a voice, video and/or data call that is established with one or more foreign service application 114, 116, 118.

Shortened Tunneled Communications Pathway

Figure 10:
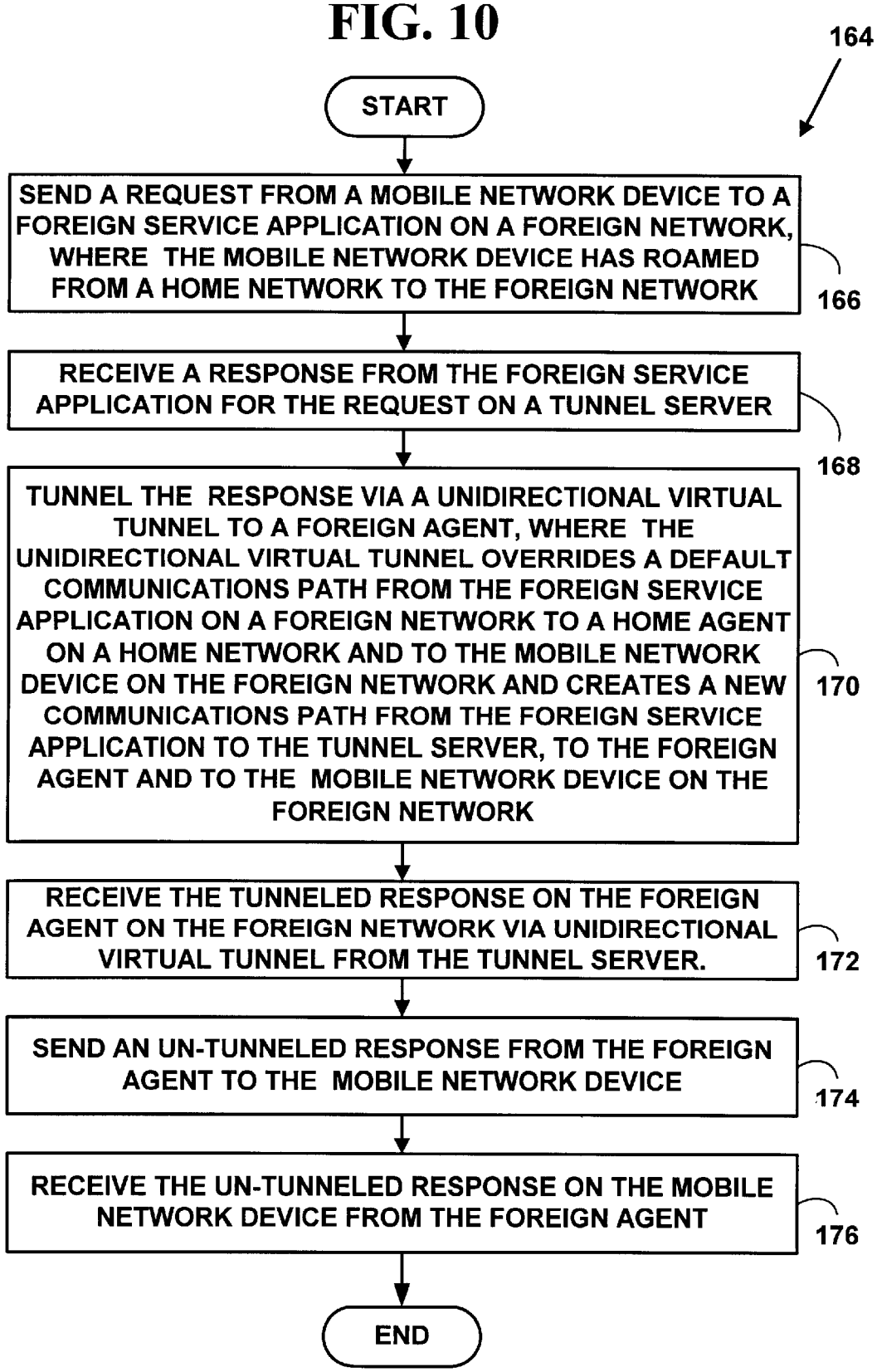
FIG. 10 is a flow diagram illustrating a method for creating a shortened communications path at a mobile network device.

FIG. 10 is a flow diagram illustrating a Method 164 for creating shortened communications path at a mobile network device. At Step 166, request is sent from a mobile network device to a foreign service application on a foreign network. The mobile network device has roamed from a home network to the foreign network. At Step 168, a response is received from the foreign service application for the request on a tunnel server. At Step 170, the response is tunneled via a unidirectional virtual tunnel to a foreign agent. The unidirectional virtual tunnel overrides a default communications path from the foreign service application on a foreign network to a home agent on a home network and to the mobile network device on the foreign network and creates a new communications path from the foreign service application to the tunnel server, to the foreign agent and to the mobile network device on the foreign network. At Step 172, the tunneled response is received on the foreign agent on the foreign network via unidirectional virtual tunnel from the tunnel server. At Step 174, an un-tunneled response is sent from the foreign agent to the mobile network device thereby reducing round-trip time delay between the foreign serve application and the mobile network-device. At Step 176, the response is received on the mobile network device.

Method 164 is illustrated with a specific exemplary embodiment. However, the present invention is not limited to this specific exemplary embodiment and other or equivalent embodiments can also be used with Method 164.

In such a specific embodiment, at Step 166 a call request (e.g., SIP, H.323, etc.) is sent from the mobile node 78 to a foreign service call application 116 on a foreign network 88. The mobile node 78 has roamed 84 from the home network 80 to the foreign network 88.

At Step 168, a call response is received from the foreign service call application 116 for the call request on the tunnel server 126. At Step 170, the call response is tunneled via a unidirectional virtual IP 48 tunnel 130 to a foreign agent 86. The unidirectional virtual tunnel 130 overrides a default communications path 132 from the foreign service call application 116 on the foreign network 88 to the home agent 76 on the home network 80 and to the mobile node 78 on the foreign network 88 and creates a new communications path 134 from the foreign service call application 116 to the tunnel server 126, to the foreign agent 86 and to the mobile node 78 on the foreign network 88.

At Step 172, the tunneled IP 48 call response is received on the foreign agent 86 on the foreign network 88 via unidirectional virtual tunnel 130 from the tunnel server 126. At Step 174, an un-tunneled call response is sent from the foreign agent 86 to the mobile node 78.

The shortened communications path from Method 164 using a unidirectional virtual tunnel 130 helps reduce RTT delays when the mobile node 78 that has roamed 84 to a foreign network 88 desires to create a communications path including a call that is established with one or more foreign service application 114, 116, 118.

Exemplary Tunneled Call Control Data Flow

Figure 11:
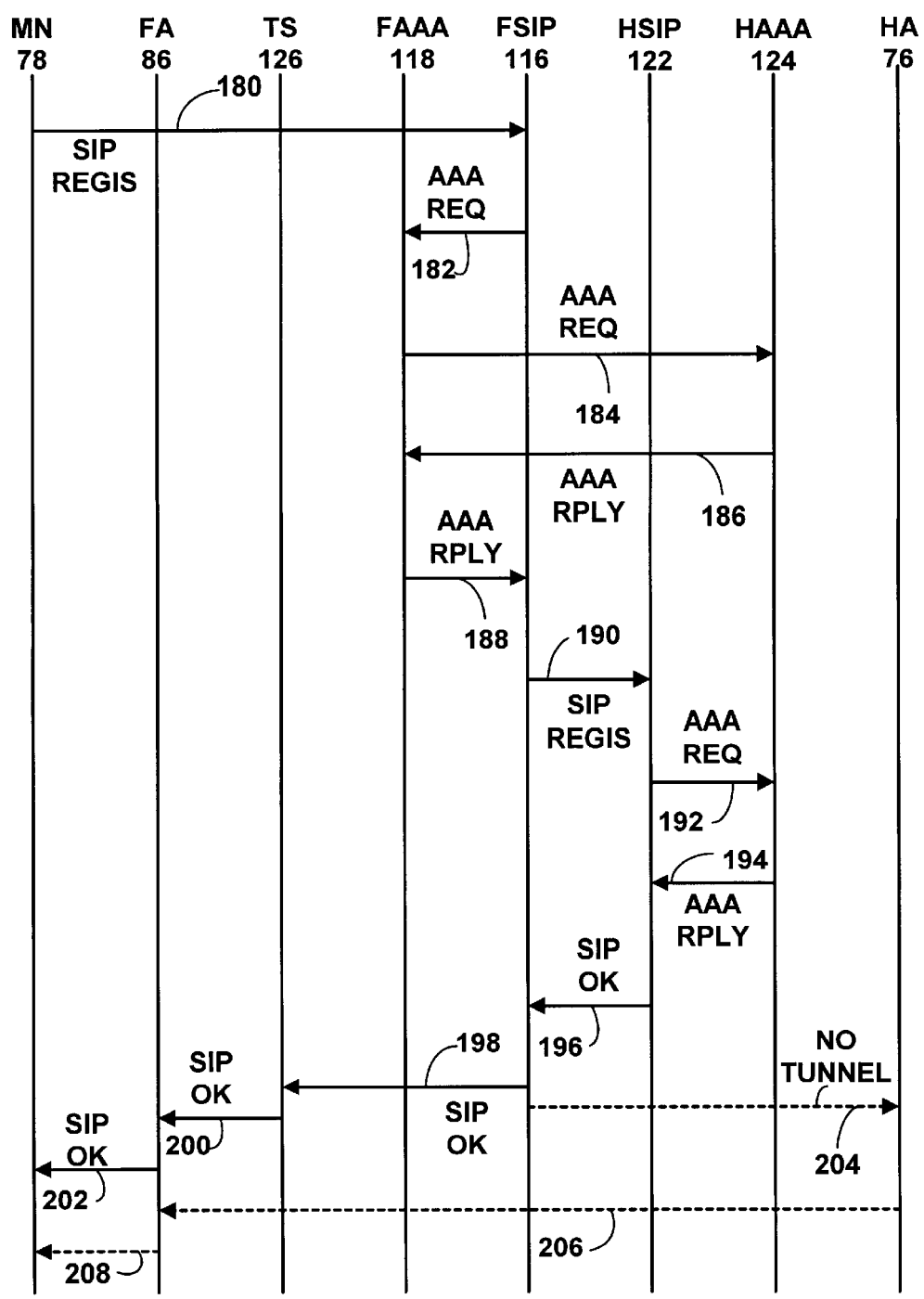
FIG. 11 is a data flow diagram illustrating an exemplary Session Initiation Protocol ("SIP") registration sequence using a unidirectional virtual tunnel.

FIG. 11 is a data flow diagram 178 illustrating exemplary SIP registration sequence using a unidirectional virtual tunnel described by the methods herein. The mobile node 78 on a foreign network 88 sends 180 a SIP registration message to the foreign SIP application 116. The foreign SIP application 116 sends 182 an AAA request message to the foreign AAA application 118 to set-up call accounting and billing, etc. on the foreign network. The foreign AAA application sends 184 an AAA request message to the home AAA application 124 to request call authentication, authorization, accounting, permission, and billing, etc. on the home network 80 for the mobile node 78. The home AAA application 124 sends 186 an AAA reply message back to the foreign AAA application 118 indicating the foreign AAA request has been acknowledged on the foreign network 88 for the mobile node 78. The foreign AAA application 118 sends 188 the AAA reply message back to the foreign SIP application 116.

The foreign SIP application 116 sends 190 sends the SIP registration message to the home SIP application 122. The home SIP application 122 sends 192 an AAA request message to the home AAA application 124 to verify call accounting and billing, etc. on the home network 80. The home AAA application 124 sends 194 an AAA response message back to the home SIP application 122 indicating that the home AAA request has been verified on the home network 80 for the mobile node 78 that has roamed 84 to the foreign network 88.

The home SIP application 122 sends 196 a SIP OK response message back to the foreign SIP application 116. The foreign SIP application 116 sends 198 the SIP OK response message to the tunnel server 126. The tunnel server tunnels 200 the SIP OK response message to the foreign agent 86. The foreign agent sends 202 the un-tunneled SIP OK response message to the mobile 78, completing the SIP registration sequence on the foreign network 88. Other incoming and outgoing calls flows to/from the mobile node 78 would have similar data flows.

FIG. 11 illustrates the tunneling of SIP call control messages. However, the present invention is not limited to tunneling SIP call control messages, and can be used to reduce RTT delay for virtually any type of foreign service application, other call control sequence messages (e.g., H.323), or foreign communications with other application programs 62.

If the methods and system described herein including unidirectional virtual tunnels 130 were not used, then the foreign SIP application 116 would send 204 the SIP OK response message to the home agent 76. Communications without using the unidirectional virtual tunnel are illustrated with dashed lines in FIG. 11. The home agent 76 would then send 206 the SIP OK response message to foreign agent 86, via other nodes (e.g., correspondent 96) and other networks (e.g., external network 82), depending on the network configuration, thereby introducing one or more additional RTT delays into the SIP call-setup. The foreign agent 86 would send 208 the SIP OK response message to the mobile node 78.

The methods and system described herein help reduce or eliminate one or more RTT delays between the foreign service applications and the mobile network device, when the mobile network device desires to establish a communications such as a call when it has roamed from its home network to a foreign network. Theses reduced RTT delays may help to improve speed of establishing a communications and improve user satisfaction.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. A method of establishing a communications path, comprising:

sending a request from a mobile network device to a foreign service application on a foreign network, wherein the mobile network device has roamed from a home network to the foreign network;

receiving a response from the foreign service application for the request on a tunnel server;

tunneling the response via a unidirectional virtual tunnel to a foreign agent, wherein the unidirectional virtual tunnel overrides a default communications path from the foreign service application on the foreign network to a home agent on the home network and to the mobile network device on the foreign network and creates a new communications path from the foreign service application to the tunnel server, to the foreign agent and to the mobile network device on the foreign network;

receiving the tunneled response on the foreign agent on the foreign network via the unidirectional virtual tunnel from the tunnel server;

sending an un-tunneled response from the foreign agent to the mobile network device, thereby reducing round-trip time delay between the foreign service application and the mobile network device; and receiving the un-tunneled response on the mobile network device.

2. The method of claim 1 wherein the mobile network device is a wireless phone, personal digital assistant, personal computer or an Internet appliance.

3. The method of claim 1 wherein the request is a call request made by the mobile network device.

4. The method of claim 1 wherein the response is a call response to a call request made by the mobile network device.

5. The method of claim 1 wherein the step of sending a request includes sending Mobile Internet Protocol (IP) request, a Session Initiation Protocol (SIP) request or an H.323 request.

6. The method of claim 1 wherein the more foreign service application includes a Session Initiation Protocol (SIP) or H.323 application.

7. A mobile tunneled communications system, comprising in combination:

a mobile network device that has roamed from a home network to a foreign network for sending requests for services from one or more foreign service applications;

one or more foreign service applications on a foreign network with a communications path to a tunnel server for providing one or more foreign services via the tunnel server to the mobile network device that has roamed from the home network to the foreign network;

a tunnel server for providing a communications path between one or more foreign service applications on the foreign network and establishing a unidirectional virtual tunnel to a foreign agent on the foreign network for providing responses from the one or more foreign services to the mobile network device via the foreign agent;

a unidirectional virtual tunnel from the tunnel server to the foreign agent for overriding a default communications path from the one or more foreign service applications on the foreign network to a home agent on the home network and to the mobile network device on the foreign network and creating a new communications path from the one or more foreign service applications to the tunnel server, to the foreign agent and to the mobile network device on the foreign network.

8. The system of claim 7 wherein the requests include Mobile Internet Protocol (IP) requests, Session Initiation Protocol (SIP) requests or H.323 requests.

9. The method of claim 7 wherein the one or more foreign service applications include Session Initiation Protocol (SIP) or H.323 foreign service applications.

10. A method for creating a tunneled communications path, comprising:
providing a communications path between one or more foreign service applications on a foreign network and a tunnel server on the foreign network;
receiving a registration request on a foreign agent on the foreign network from a mobile network device that has roamed from a home network to the foreign network; and
establishing a unidirectional virtual tunnel from the tunnel server to the foreign agent, wherein the unidirectional virtual tunnel overrides a default communications path from the one or more foreign service applications on the foreign network to a home agent on the home network and to the mobile network device on the foreign network and creates a new communications path from the one or more foreign service applications to the tunnel server, to the foreign agent and to the mobile network device on the foreign network.

11. The method of claim 10 wherein the mobile network device is a wireless phone, personal digital assistant, personal computer or an Internet appliance.

12. The method of claim 10 wherein the registration request is a Mobile Internet Protocol registration request.

13. The method of claim 10 wherein the one or more foreign service applications include Session Initiation Protocol (SIP) or H.323 applications.

14. The method of claim 10 further comprising:
tunneling data packets at the tunnel server from the one or more foreign service applications via the unidirectional virtual tunnel to the foreign agent; and
sending un-tunneled data packets from the foreign agent to the mobile network device.

15. The method of claim 10 wherein the unidirectional virtual tunnel includes a unidirectional virtual Internet Protocol (IP) tunnel.

16. A method of establishing a tunneled communications path, comprising:
receiving a response on a tunnel server on a foreign network from a foreign service application on the foreign network for a request from a mobile network device that has roamed from a home network to the foreign network;
tunneling the response via a unidirectional virtual tunnel to a foreign agent, wherein the unidirectional virtual tunnel overrides a default communications path from the foreign service application on the foreign network to a home agent on the home network and to the mobile network device on the foreign network and creates a new communications path from the foreign service application to the tunnel server, to the foreign agent and to the mobile network device on the foreign network.

17. The method of claim 16 wherein the mobile network device is a wireless phone, personal digital assistant, personal computer or an Internet appliance.

18. The method of claim 16 wherein the response is a response to a call request made by the mobile network device.

19. A method of establishing a communications path, comprising:
receiving a tunneled response on a foreign agent on a foreign network via unidirectional virtual tunnel from a tunnel server, wherein the tunneled response is for a request from a mobile network device that has roamed from a home network to the foreign network; and wherein the unidirectional virtual tunnel overrides a default communications path from a foreign service application on the foreign network to a home agent on the home network and to a mobile network device on the foreign network and creates a new communications path from the foreign service application to the tunnel server, to the foreign agent and to the mobile network device on the foreign network;
sending an un-tunneled response from the foreign agent to the mobile network device.

20. The method of claim 19 wherein the mobile network device is a wireless phone, personal digital assistant, personal computer or an Internet appliance.

21. The method of claim 19 wherein the response is a response to a call request made the mobile network device.

22. A method of creating a shortened communications path, comprising:
sending a request from a mobile network device to a foreign service application on a foreign network, wherein the mobile network device has roamed from a home network to the foreign network;
receiving a response on the mobile network device for the request from a foreign agent on the foreign network, wherein the response was received on the foreign agent via a unidirectional virtual tunnel from a tunnel server, wherein the unidirectional virtual tunnel overrides a default communications path from the foreign service application to a home agent on the home network, and to the mobile network device on the foreign network and creates a new communications path from the foreign service application to the tunnel server, to the foreign agent and to the mobile network device on the foreign network.

23. The method of claim 22 wherein the mobile network device is a wireless phone, personal digital assistant, personal computer or an Internet appliance.

24. The method of claim 22 wherein the response is a response to a call request made the mobile network device.

25. The method of claim 22 where in the request is a call request made by the mobile network device.

26. The method of claim 25 wherein the call request is a Session Initiation Protocol (SIP) or a H.323 call request.

27. The method of claim 22 wherein the sending step includes:
notifying the mobile network device of a network address of a foreign service application on the foreign network with a notification mechanism; and
sending a request from a mobile network device to the network address for the foreign service application.

28. The method of claim 27 wherein the notification mechanism includes a Dynamic Host Configuration Protocol (DHCP) message, Service Location Protocol (SLP) message or an extension to a Mobile Internet Protocol advertisement message.

29. A computer readable medium having stored therein instructions for causing a processor to execute the method of claim 1.

30. A computer readable medium having stored therein instructions for causing a processor to execute the method of claim 10.

31. A computer readable medium having stored therein instructions for causing a processor to execute the method of claim 16.

32. A computer readable medium having stored therein instructions for causing a processor to execute the method of claim 19.

33. A computer readable medium having stored therein instructions for causing a processor to execute the method of claim 22.

* * * * *